Figure 1:
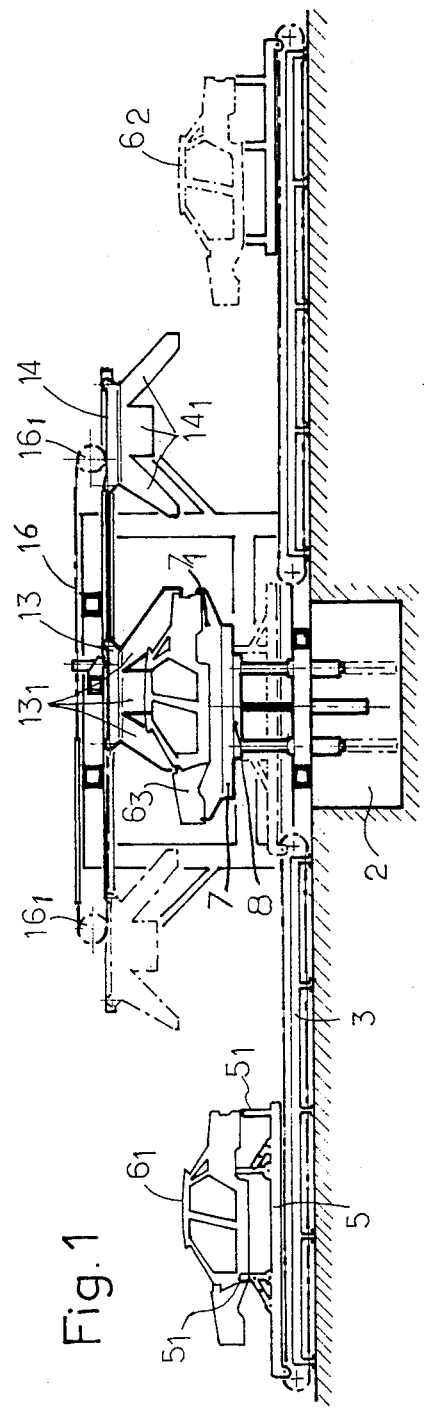

United States Patent [19]

Sciaky et al.

[11] Patent Number: 4,757,607
[45] Date of Patent: Jul. 19, 1988

[54] INSTALLATION FOR ASSEMBLING SEVERAL CAR BODY MODELS OF THE SAME TYPE OF MOTOR VEICLE

[75] Inventors: Mario Sciaky, Paris; Jean-Jacques Marianne, Combs la Ville; Pierre Jablonski, Creteil; Michel Leonard, Maisons Alford, all of France

[73] Assignee: Sciaky S.A., Vitry Sur Seine, France

[21] Appl. No.: 908,976

[22] Filed: Sep. 17, 1986

Related U.S. Application Data

[63] Continuation of Ser. No. 691,243, Jan. 14, 1985, abandoned.

[30] Foreign Application Priority Data

Jan. 12, 1984 [FR] France .................. 84 0034

[51] Int. Cl.⁴ .............................. B23P 21/00
[52] U.S. Cl. ........................... 29/771; 29/793; 29/794
[58] Field of Search .............. 198/345, 346.1, 346.2; 29/464, 469, 771, 793–794

[56] References Cited

U.S. PATENT DOCUMENTS

| 2,757,447 | 8/1956 | Barenyi | 29/794 |
| 2,779,092 | 1/1957 | Gordon | 29/794 |
| 3,022,105 | 2/1962 | Tjaarda | 29/469 |
| 3,541,668 | 11/1970 | Wessells et al. | 29/469 |
| 4,033,033 | 5/1977 | Heffner | 29/469 |

Primary Examiner—Timothy V. Eley
Attorney, Agent, or Firm—Seidel, Gonda, Goldhammer & Abbott

[57] ABSTRACT

(a) This installation comprises means for positioning and holding car body parts and devices for welding these parts to one another. (b) This installation is characterized in that it comprises a rigid, fixed stand (1) provided in its upper part with a horizontal conveyor track (11) for carriages (12) referred to as upper carriages each having elements for positioning and holding components of the upper part of a particular car body model of the motor vehicle, and provided in its lower part with a lift (8,10) containing centering devices cooperating with the components of the lower part of a type of motor vehicle body, which lower part is common to several models.

4 Claims, 3 Drawing Sheets

INSTALLATION FOR ASSEMBLING SEVERAL CAR BODY MODELS OF THE SAME TYPE OF MOTOR VEICLE

This application is a continuation of application Ser. No. 691,243 filed Jan. 14, 1985 now abandoned.

This invention relates to an installation for assembling several models of car bodies of one and the same type of vehicle.

The car bodies are assembled on automatic chains in which the components, consisting of stamped sheets, are positioned and provisionally assembled and these bodies are then conveyed to a welding station where the different pieces are positioned and held in position and a certain number of welding points known as "pinning welds" are made before the body is then completely welded on a so-called finishing chain.

Any one particular type of motor vehicle generally has a plurality of models which differ from one another, for example, in the number of the doors, one model having four doors, another two doors or another five doors. These different models of one and the same type of vehicle, however, have various parts in common, in particular all those parts forming the lower part of the car body, such as the floor, the front unit, the rear unit and the lower parts of the side panels.

The roof and the front and rear window, on the other hand, differ from one model to the other.

Modern installations hitherto available for the construction of motor vehicles are designed as multipurpose installations which, if suitably programmed, are equally suitable for assembling any of several different car body models corresponding to several types of vehicles.

These installations have a character of universality and are designed to satisfy a very wide range of possibilities.

These installations are, however, complicated and very difficult to use whereas in practice any given type of vehicle would normally be expected to have only two or three different models of car bodies and some of the parts of the bodies would be identical and require no adaptation of the machines or tools so that they would not require the use of automatic multipurpose installations.

It is one of the main objects of the present invention to overcome these disadvantages, and with this end in view it relates to an installation for the assembly of several different models of car bodies of the same type of motor vehicle, the installation comprising means for positioning and holding in position the parts of the car body and devices for welding these parts to one another, the installation being characterised in that it comprises a rigid, fixed supporting structure or stand which is provided in its upper part with a horizontal conveyor track for carriages referred to as upper carriages each comprising the elements for positioning and holding in position the components of the upper part of a particular model of car body for the motor vehicle and in its lower part with a lift designed to receive centering devices cooperating with the components of the lower part of a type of car body, which components are common to several different models of the motor vehicle. This lift is movable between two positions, namely a lower position, in which the lift is placed between a track bringing the car bodies to be welded and a track for removing the welded bodies, these tracks providing for the displacement of those carriages referred to as lower carriages for supporting the car body, and an upper position, in which the body of a particular model of vehicle is engaged by the positioning and holding devices designed for the particular model of vehicles, supported by one of the upper carriages.

According to another characteristic of the invention, the supporting structure or stand has pivoting side flaps comprising elements for positioning and holding the lower part of the side panels which are common to all the different models of one type of car body, these flaps being placed to hold these side panels of the car body when the lift is in the raised position.

According to another characteristic of the invention, the horizontal conveyor track for the upper carriages is parallel to the displacement tracks for the lower carriages.

Figure 2:
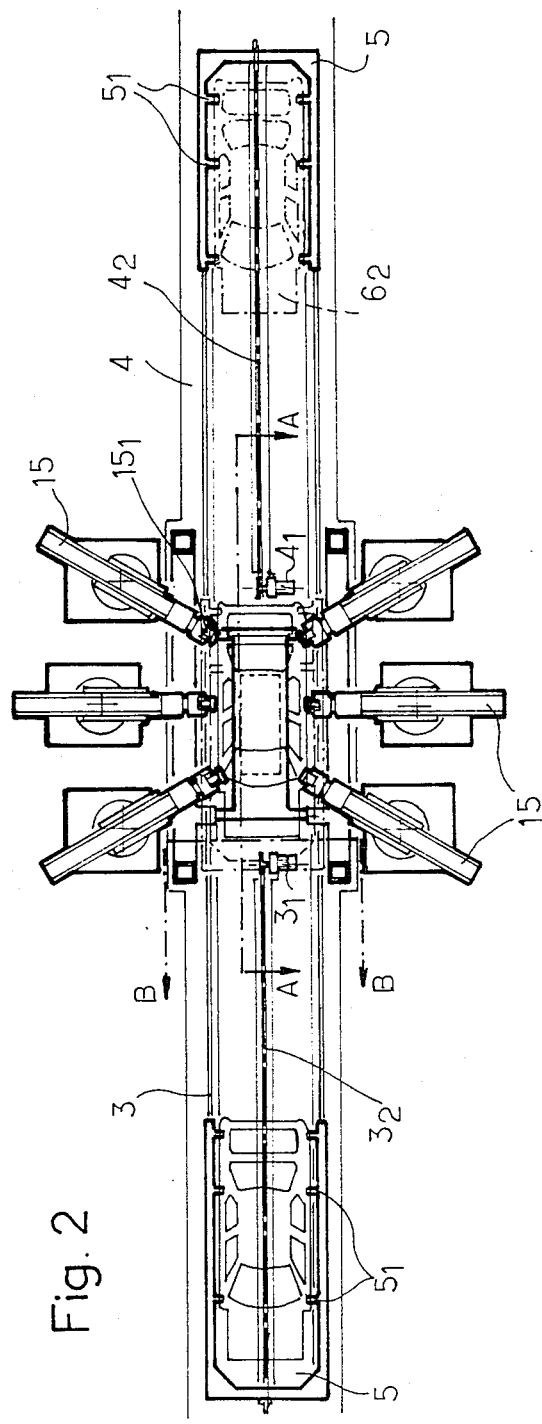
Figure 3:
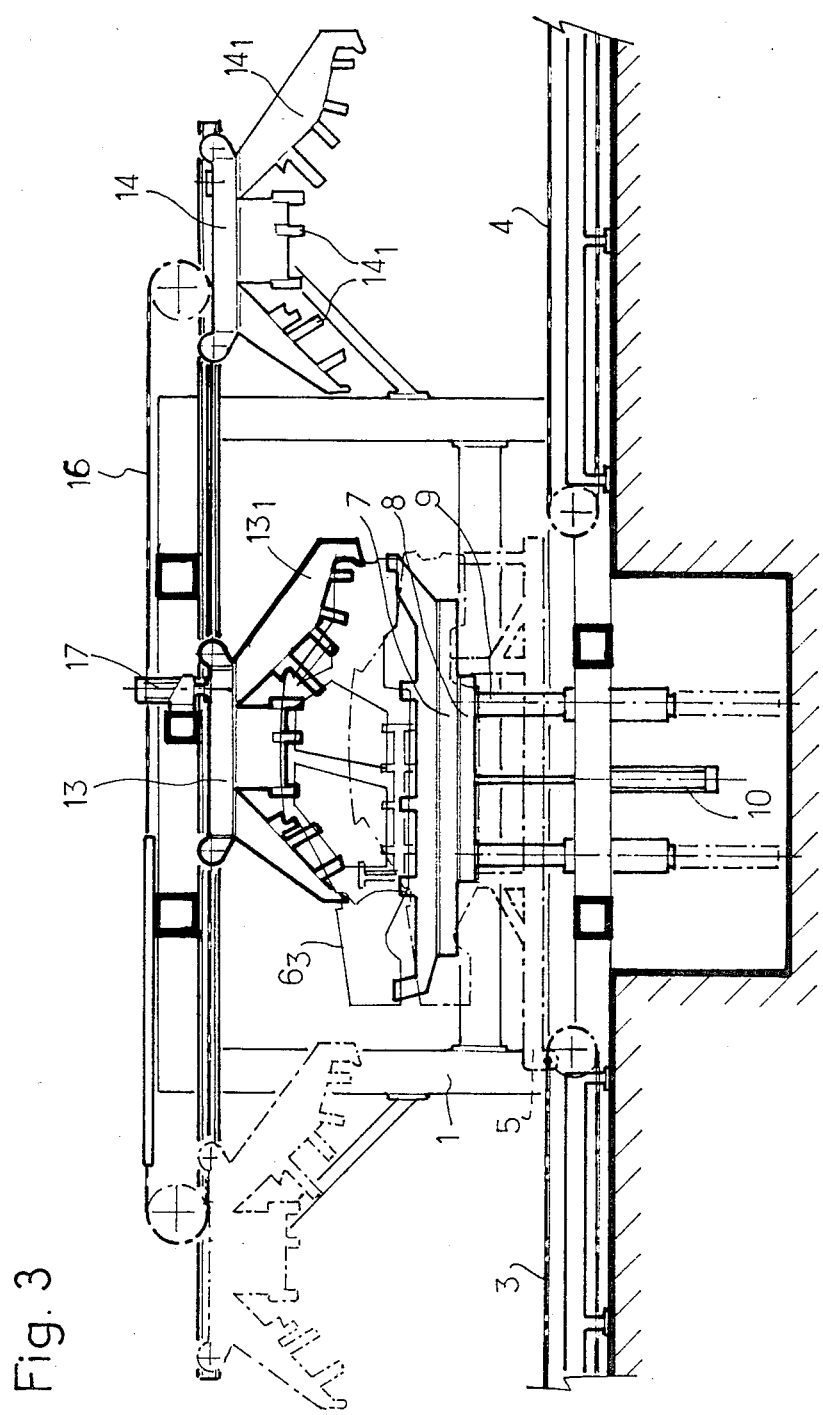
Figure 4:
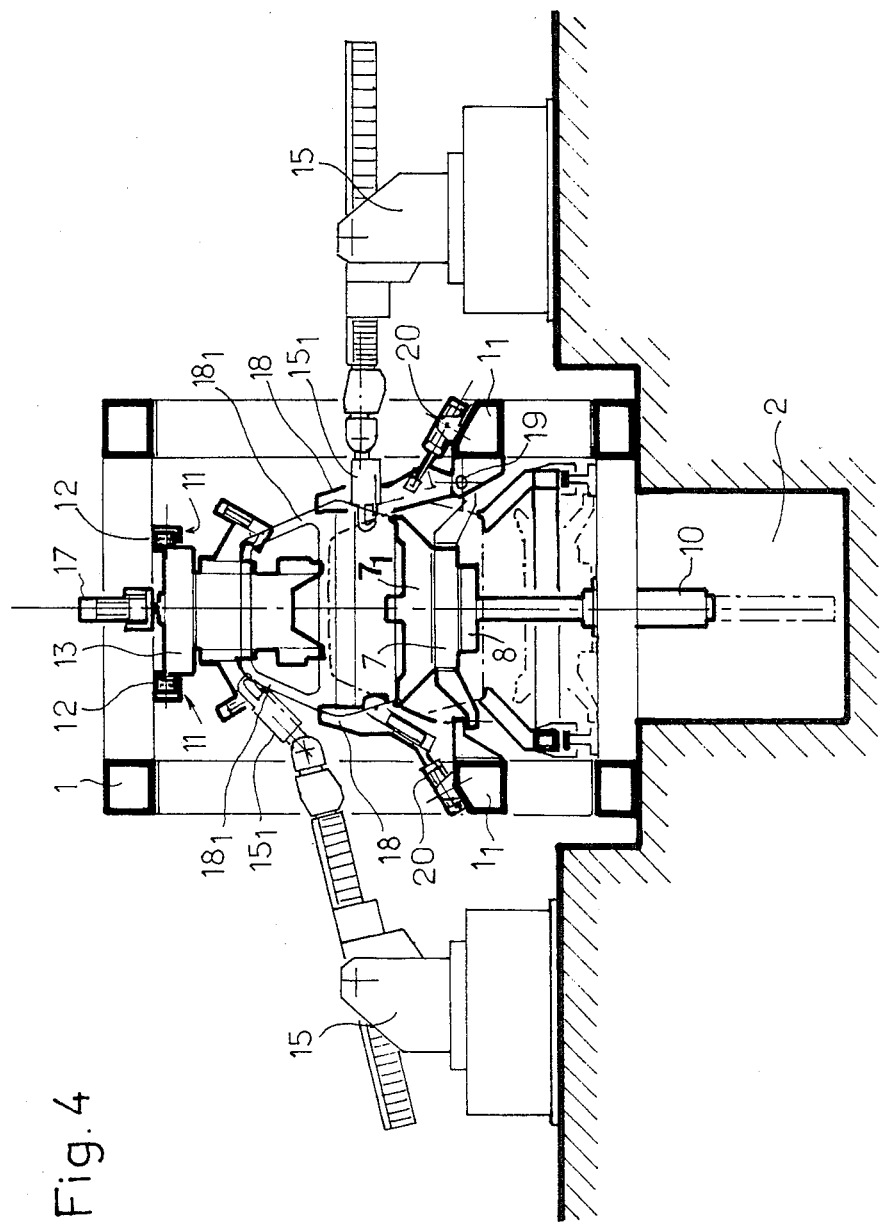

The invention is illustrated by way of non-limiting example in the attached drawings, in which FIG. 1 is a side view of the installation according to the invention, FIG. 2 is a top plan view of FIG. 1, with the upper part of the stand 1 cut away, FIG. 3 is a section taken on the line A—A of FIG. 2, and FIG. 4 is a section taken on the line B—B of FIG. 2

It is an object of the present invention to provide an assembly station for several models of car bodies of the same type of vehicle, these various models all having a similar lower part and differing only in their upper part, for which alone the positioning and holding tools must be adapted individually to each model of car body.

Briefly, according to the invention, upper, movable carriages are arranged on a rigid, fixed supporting structure or stand. Each of these carriages has positioning and holding devices corresponding to a particular model of car body. Lower carriages are also provided, and these are common to all the different models of car bodies of this type of vehicle. These lower carriages serve to transport the preassembled car bodies of all the different models of the type of vehicle to the stand where the car body is positioned and pin welded, and these lower carriages subsequently remove the welded car bodies.

This installation is composed of a rigid and fixed supporting structure or stand 1 which is placed above a pit 2, with two horizontal transfer tracks 3 and 4 arranged in alignment each abutting on the base of this stand.

The track 3 serves for the displacement of the preassembled car bodies $6_1$ to the stand 1 where they are pinned together and the pinned car bodies $6_2$ are then removed along the track 4.

These movements are produced by motors $3_1$, $4_1$ by way of chains $3_2$, $4_2$.

During these movements, the car bodies, of no matter what model, are held and supported by so-called lower carriages 5 which are all identical and have centering means $5_1$ consisting, for example, of studs which fit into corresponding orifices in the parts of the underframe of the carriage which are common to all the car body models of one type of vehicle.

The aforesaid conveyor tracks 3 and 4 which end on either side of the stand 1 are situated at the two ends of a platform 7 which is fixed on a lift 8 which in turn is mounted on the stand 1 by means of vertical guide columns 9.

This platform 7 supports centering devices $7_1$ which also consist of studs engaging in corresponding orifices in the parts of the underframe of the car body which are common to all the models of car body of one type of vehicle. These devices $7_1$ are arranged on the platform 7 in between the positioning and holding devices $5_1$ of the carriages 5 which are successively carried over the platform 7 by the conveyor track 3.

A jack 10 is provided for the vertical displacement of the lift 8 and its platform 7.

The action of this jack 10 displaces the platform 7 between a lower position and an upper position. In the lower position (represented by broken lines in the drawings), the platform is situated in the extension of the tracks 3 and 4 so as to enable a carriage 5 supporting a car body to be placed over the positioning devices $7_1$ of the platform 7 with a view to welding or to enable the car body to be removed along the track 4 after it has been welded. The upper position of this platform 7 and lift 8 (represented in solid lines in FIGS. 3 and 4) corresponds to the welding position $6_3$ for the car body.

Thus when a carriage 5 is brought into vertical alignment with the platform 7, the lift 8 is raised so that the positioning devices $7_1$ engage with the parts of the underframe of the car body and raise the car body while separating it from the positioning devices $5_1$ of the carriage 5, which remains in the lower position.

When the car body arrives at the raised position or position for pinning by welding $6_3$, it is taken in charge by two types of positioning and holding devices, the devices of one type being common to all the different car body models and mounted in a fixed position on the stand 1 while the devices of the other type may be selected according to the particular model of the body to be pinned and are interchangeable on the stand 1.

For this purpose, the stand 1 is provided at its sides $1_1$ with flaps 18 which are hinged near the bottom on shafts 19 which extend parallel to the roller tracks 3 and 4. These side flaps can be moved between an open position and a closed position by jacks 20.

These flaps 18 have elements provided for positioning the lower parts of side panels $18_1$ of the car bodies, and are thus common to all the different models which are to be assembled on this chain.

These positioning devices 18 are mounted on the lateral parts $1_1$ of the stand 1 so as to come into operative position on the lower parts of the side panels 18 of the car body when the car body is in the raised position for welding (see in particular FIGS. 3 and 4).

The movable positioning devices provided for the different models of car bodies are also arranged on the stand 1.

For this purpose, the upper part of the stand 1 has rails 11 which constitute horizontal rolling tracks for the rollers 12 of carriages 13 and 14. These carriages, which are two in number in the example represented here, are hooked under an endless chain 16 which is held by pinions $16_1$ and is driven by an electric motor 17.

Each of these carriages 13 and 14 supports positioning and holding devices $13_1$ and $14_1$ corresponding to a model of car body, so that these positioning devices are adapted, for each carriage 13 and 14, to the form and dimensions of the roof, front window and rear window of a car body model.

These carriages 13 and 14 are simultaneously displaceable in one sense or the other on rails 11 by means of an electric motor 17 driving the endless chain 16.

The carriage 13 or 14 corresponding to the particular car model situated in the upper, welding position $6_3$ inside the stand 1 can thus be placed in vertical alignment with the platform 7 by operation of this motor 17.

According to the invention, the positioning and holding devices for a car body are thus divided into two categories, those (18) which are common to all the models of a type and are fixed on the stand to be simply moved from an open position to a closed position, and those ($13_1$, $14_1$) which vary from one model to the other and are movable on the stand 1 so that they can be rapidly selected according to the model of car body which is supported on the platform 7 arriving in the raised position for welding $6_3$ inside the stand.

In this construction, the centering devices $5_1$ used for transferring the car bodies to the welding zone are also common to all the car bodies and are arranged on the movable carriages 5 at the level of the lower zone of the stand whereas the centering devices $7_1$ used for raising the car bodies are arranged on the platform 7 of the lift.

These arrangements provide the possibility of constructing a relatively simple welding installation which can be easily operated and rapidly adapted.

This arrangement also facilitates the possibility of positioning welding robots 15 for pin welding the car bodies since the stand 1 can be designed so that it does not interfere with the positioning of robots 15 laterally to the stand nor with the programmed displacement of their welding head $15_1$ to reach the various points for the final welding of the car body.

The displacement of these welding heads $15_1$ of the robots 15 is also facilitated by the fact that it is not obstructed by the positioning and holding devices, some of which (18) are arranged in the lower zone of the car body and the others ($13_1$ or $14_1$) in the upper zone of this car body.

In the embodiment represented by way of example, the platform 7 has positioning devices $7_1$ which replace those of the carriages 5 in order to lift the car body. Under these conditions and during the welding operation, the carriage 5 which has brought the car body to the welding station returns to its initial position along the track 3 to take up a fresh car body while another carriage 5 moves along the track 4 into the stand 1 where it can take up the welded car body after lowering of the lift 8 to take it to the final welding chain.

According to another embodiment, the platform 7 of the lift could be designed to lift the car bodies together with their carriage 5, these car bodies being in that case preferably supported by the same carriage during the whole operation from their arrival along the track 3 to their removal along the track 4.

We claim:

1. Apparatus for positioning and holding car body parts and for welding these parts to one another, comprising a fixed, rigid supporting stand (1) having an upper part with a horizontal conveyor track (11) and at least two upper carriages (13, 14), each having positioning and holding devices for components of the upper part of different car body models of a motor vehicle; said supporting stand having a lower part with a lift (8, 10) positioned over a pit and carrying centering devices cooperating with the components of the lower part of a type of car body for a motor vehicle, which car body lower part is common to several models, said lift being disposed between horizontal transfer tracks arranged in alignment and each abutting the base of said stand, and said lift being displaceable between two positions, namely a lower position in which the lift is situated between and in alignment with said transfer tracks (3, 4) one of which tracks (3) is for bringing to said stand car bodies to be welded and the other of which tracks (4) is for removing from said stand car bodies which have been welded and an upper position, in which the car body of a model of vehicle engages with the positioning and holding devices ($13_1$, $14_1$) for one of the corresponding models of vehicles, supported by one of the upper carriages (13, 14).

2. Apparatus according to claim 1, wherein the stand (1) is provided with pivoting side flaps having positioning and holding elements for side panels ($18_1$) of the car body lower part, the flaps being placed to hold the side panels of the car body lower part when the lift is in the raised position.

3. Apparatus according to any one of the preceding claims, wherein the horizontal conveyor track (11) for the upper carriages (13, 14) is parallel to the conveyor tracks (3, 4).

4. Apparatus according to claim 2, wherein the flaps (18) are arranged in a lower zone of the stand to permit ready access to the car body by welding robots positioned in lateral relation to the stand.

* * * * *